United States Patent [19]

Crossan et al.

[11] 4,020,044
[45] Apr. 26, 1977

[54] METHOD OF INCREASING THE MOLECULAR WEIGHT OF HYDROXYL ENDBLOCKED POLYDIORGANOSILOXANES

[75] Inventors: Irvin D. Crossan, Homer Township, Midland County; Louis H. Toporcer, Ingersol Township, Midland County, both of Mich.

[73] Assignee: Dow Corning Corporation, Midland, Mich.

[22] Filed: July 16, 1975

[21] Appl. No.: 596,475

[52] U.S. Cl. .................. 260/46.5 UA; 260/46.5 G
[51] Int. Cl.² ........................................ C08G 77/04
[58] Field of Search ............. 260/46.5 UA, 46.5 G, 260/46.5 R

[56] References Cited

UNITED STATES PATENTS 3,776,934  12/1973  Toporcer et al. .......... 260/46.5 R X

FOREIGN PATENTS OR APPLICATIONS 823,239  9/1969  Canada ........................... 260/46.5

Primary Examiner—Lewis T. Jacobs
Attorney, Agent, or Firm—Roger H. Borrousch

[57] ABSTRACT

The method of mixing a hydroxyl endblocked polydiorganosiloxane and a silane of the formula

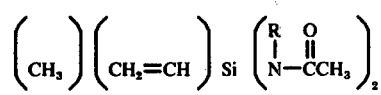

where R is alkyl of one to four carbon atoms or phenyl and allowing the mixture to react at room temperature provides a polydiorganosiloxane of increased molecular weight in a short time, such as a few minutes to several hours. The resulting polydiorganosiloxane product contains methylvinylsiloxane units which are functional and can be further reacted with silicon-bonded hydrogen atoms or organic peroxides to give new polymers or cured products such as rubbers.

7 Claims, No Drawings

METHOD OF INCREASING THE MOLECULAR WEIGHT OF HYDROXYL ENDBLOCKED POLYDIORGANOSILOXANES

BACKGROUND OF THE INVENTION

1. Field of the Invention

This invention relates to a method of increasing the molecular weight of hydroxyl endblocked polydiorganosiloxane and to the polydiorganosiloxane obtained thereby.

2. Description of the Prior Art

The hydroxyl endblocked polydiorganosiloxanes and the silanes used in the present invention are known in the art. The silanes used in this invention are described by Toporcer and Crossan in U.S. Pat. No. 3,776,933 which is hereby incorporated by reference to show the silanes and the preparation thereof.

Klebe in U.S. Pat. No. 3,488,371 describes the following silanes

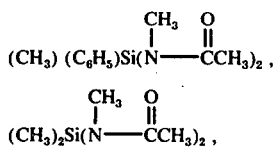

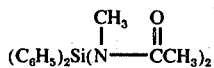

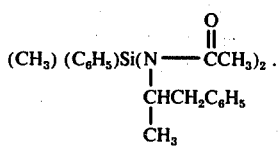

and

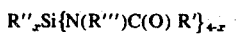

Klebe describes that these silanes can be hydrolyzed with water in a solvent to yield rubbery siloxanes.

Toporcer and Crossan in U.S. Pat. No. 3,776,933 describe silanes of the formula $$R''_xSi\{N(R''')C(O) R'\}_{4-x}$$

where R' is methyl, ethyl or phenyl, R'' is a hydrocarbon radical, R''' is ethyl, propyl or phenyl and x is 1, 2 or 3, as useful as crosslinking agents in silicone rubber, as hydrolyzable silanes to make silicone resins, as chain extenders in silicone rubbers, as endblockers for silicone fluids and silylating agents.

Toporcer and Clark in U.S. Pat. No. 3,776,934 describes methylvinyldi-(N-methylacetamido) silane and teach that it is useful as an effective chain extender in room temperature vulcanizable silicone elastomer compositions and term this silane an "in situ chain extender".

Although Toporcer and Clark describe chain extension as meaning that the molecular weight of the polydiorganosiloxane is effectively increased as observed from the properties of the cured silicone elastomer, they do not suggest making polydiorganosiloxanes. Likewise, Toporcer and Crossan suggest that their silanes are useful as chain extenders in silicone rubbers. Klebe does not suggest such chain extension but describes his silanes as useful to make rubbery siloxanes by hydrolysis.

SUMMARY OF THE INVENTION

It is therefore an object of this invention to provide a method of preparing polydiorganosiloxanes and the polydiorganosiloxanes prepared thereby.

The molecular weight of a hydroxyl endblocked polydiorganosiloxane can be increased by mixing it with a silane from a class defined by the general term methlvinyldiamidosilanes. The reaction occurs rapidly at room temperature to provide a polydiorganosiloxane of increased molecular weight compared to the starting polydiorganosiloxane. The polydiorganosiloxane does not only have a higher molecular weight but also has vinyl functionality distributed along the polymer chain which can be used for further reaction, such as in curing reactions.

DESCRIPTION OF THE INVENTION

This invention relates to a method of increasing the molecular weight of a hydroxyl endblocked polydiorganosiloxane comprising mixing the hydroxyl endblocked polydiorganosiloxane where the organic groups are monovalent radicals selected from the group consisting of methyl, phenyl and 3,3,3-trifluoropropyl, the organic groups being at least 50 percent methyl radicals, and a silane of the formula

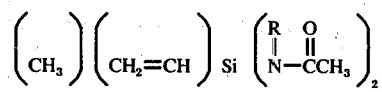

in which R is a monovalent radical selected from the group consisting of an alkyl radical of one to four carbon atoms per radical and phenyl radical, and thereafter recovering a polydiorganosiloxane having a molecular weight higher than the polydiorganosiloxane mixed with the silane and having methylvinylisiloxane units distributed along the chain of the polydiorganosiloxane of increased molecular weight, said methylvinylsiloxane units coupling the polydiorganosiloxane molecules initially mixed with the silane.

The hydroxyl endblocked polydiorganosiloxanes are those which have methyl, phenyl or 3,3,3-trifluropropyl radicals as the organic groups. The organic groups are at least 50 percent methyl radicals. These polydiorganosiloxanes include hydroxyl endblocked polydimethylsiloxane, hydroxyl endblocked polymethyl-3,3,3-trifluoropropylsiloxane and hydroxyl endblocked copolymers made up of two or more siloxane units such as dimethylsiloxane units, methylphenylsiloxane units, diphenylsiloxane units and methyl-3,3,3-trifluoropropylsiloxane units. The hydroxyl endblocked polydiorganosiloxane can be homopolyers, copolymers, mixtures of homopolymers, mixtures of copolymers and mixtures of copolymers and homopolymers. The hydroxyl endblocked polydiorganosiloxane is substantially a linear polymer, but it can contain small amounts of monoorganosiloxane units where the organic groups are the same as defined above, such units can include monomethylsiloxane units and monophenylsiloxane units. These hydroxyl endblocked polydiorganosiloxanes can have molecular weight which have a broad range of values. The molecular weights are such the viscosities range from thin fluids to viscous fluids.

The silanes of the general formula

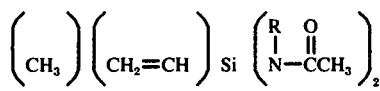

where R is methyl, ethyl, propyl, butyl or phenyl can be prepared by the method of U.S. Pat. No. 3,776,933. The method for making the amidosilanes comprises mixing methylvinyldichlorosilane and a sodium salt of the appropriate organic amide in an organic solvent solution. Sodium chloride precipitates and is separated from the organic solvent solution. The organic solvent can then be stripped from the solution to leave the amidosilane product. The silanes can be used individually or as mixtures of different silanes defined by the formula.

By mixing the hydroxyl endblocked polydiorganosiloxane with the silane, a polydiorganosiloxane of higher molecular weight is obtained. This mixture reacts very rapidly and the reaction goes to completion at room temperature in a short time ranging from a few minutes up to several days. Although there is no need to heat the reacting mixture, some heating could be used to hasten the completion of the reactions which are the slowest. The mixtures are reacted neat and do not require a solvent, but, if desirable, an organic solvent could be used. However, for most uses of the polydiorganosiloxane product, solvents are not used, therefore, it is more desirable to mix the ingredients neat to avoid the waste of energy and time to remove the solvent.

The amount of silane used will depend upon the desired molecular weight of the final product and the amount of vinyl one wishes in the final product. To make gum consistency polydiorganosiloxanes, one preferably uses from 1 to 3 moles of silane molecule per mole of silicon-bonded hydroxyl of the hydroxyl endblocked polydiorganosiloxane. Smaller amounts of silane in the reaction mixture provide less increase in molecular weight, up to about one mole of silane molecule per silicon-bonded hydroxyl. At about one mole of silane per mole of silicon-bonded hydroxyl and above, gum consistency polydiorganosiloxanes are obtained. The reaction becomes slower the larger the moles of silane per mole of silicon-bonded hydroxyl and therefore more than about 10 moles of silane per mole of silicon-bonded hydroxyl is not practical.

The advantages of this method are, the reaction takes place at room temperature and gum consistency products can be obtained without heating and without solvent in relatively short times from low molecular weight polydiorganosiloxanes. Inasmuch as the silane becomes a part of the polydiorganosiloxane product and the silane contains a vinyl group, this method produces a special class of polydiorganosiloxanes which have vinyl groups attached to silicon atoms distributed along the polymer chain at intervals determined by the molecular weight of the starting polydiorganosiloxane. The vinyl groups in the product polydiorganosiloxane are particularly useful as reactive sites for crosslinking the product polydiorganosiloxane into elastomers, gels and resinous products, depending upon the amount of vinyl and the molecular weight of the starting polydiorganosiloxane. The crosslinking can be readily accomplished by organic peroxides, a special class being the vinyl specific organic peroxides or through reaction with compounds containing silicon-bonded hydrogen atoms in the presence of a platinum catalyst. Also the vinyl containing polydiorganosiloxanes can be used, to make new polydiorganosiloxanes by reacting the vinyl group with a silicon-bonded hydrogen atom and thereby attaching new groups or functionality.

The following examples are presented for illustrative purposes only and should not be construed as limiting the present invention which is properly delineated in the claims.

EXAMPLE 1

Mixtures were prepared by combining at room temperature 10 grams of a hydroxyl endblocked polydimethylsiloxane having a viscosity of about 4,000 centipoise at 25° C. with an amount of methylvinyldi-(N-phenylacetamido)-silane as shown in Table I. The change in viscosity was observed at different time intervals as indicated in Table I.

Table I

| Silane, grams | after | | |
| --- | --- | --- | --- |
| | 1 hour | 1.5 hours | 18.5 hours |
| 0.1 | Thicker fluid | Thick, tacky fluid | Thick tacky fluid |
| 0.2 | Thicker fluid | " | Tacky gum |
| 0.3 | fluid | " | Slightly tacky gum |
| 0.4 | fluid | " | " |
| 0.5 | fluid | " | " |

EXAMPLE 2

A hydroxyl endblocked polydimethylsiloxane having a viscosity of about 60 centipoise at 25° C. in the amount of 10 grams was mixed at room temperature with 1.0 gram of methylvinyldi-(N-methylacetamido) silane. In 24 hours a high molecular weight polydimethylsiloxane gum containing methylvinylsiloxane units was recovered.

EXAMPLE 3

A hydroxyl endblocked polydimethylsiloxane having a viscosity of about 60 centipoise at 25° C. and having 17.9 parts by weight monomethylsiloxane units per one million parts by weight of total polydimethylsiloxane, in the amount of 10 grams, was mixed at room temperature with 1.2 grams of methylvinyldi-(N-methylacetamido) silane. In 24 hours, a polydimethylsiloxane gum containing methylvinylsiloxane units and having a Williams plasticity of 0.107 inch was recovered. A solution of 10 weight percent of the gum in toluene had a viscosity of 185.5 centipoise at 25° C.

EXAMPLE 4

A hydroxyl endblocked polydimethylsiloxane having a viscosity of about 60 centipoise at 25° C. and having 127 parts by weight monomethylsiloxane units per one million parts by weight of total polydimethylsiloxane, in the amount of 10 grams, was mixed at room temperature with 1.28 grams of methylvinyldi-(N-methylacetamido) silane. In 24 hours, a polydimethylsiloxane gum containing methylvinylsiloxane units and having a Williams plasticity of 0.103 inch was recovered. A solution of 10 weight percent of the gum in toluene had a viscosity of 156.4 centipoise at 25° C.

EXAMPLE 5

A hydroxyl endblocked polydimethylsiloxane having a viscosity of about 4,000 centipoise at 25° C., in the amount of 10 grams, was mixed at room temperature with 0.2 grams of methylvinyldi-(N-methylacetamido)-silane. In 24 hours, a polydimethylsiloxane gum containing methylvinylsiloxane units and having a Williams plasticity of 0.079 inch was recovered. A solution of 10 weight percent of the gum in toluene had a viscosity of 205.7 centipoise at 25° C.

EXAMPLE 6

A hydroxyl endblocked polydimethylsiloxane having a viscosity of about 12,500 centipoise at 25° C., in the amount of 10 grams, was mixed at room temperature with 0.1 gram of methylvinyldi-(N-methylacetamido)-silane. In 24 hours, a polydimethylsiloxane gum containing methylvinylsiloxane units and having a Williams plasticity of 0.080 inch was recovered. A solution of 10 weight percent of the gum in toluene had a viscosity of 234.9 centipoise at 25° C.

The gums as prepared in Examples 2, 3, 4 and 5 can be compounded with such fillers as silica, diatomaceous earth, ground quartz and calcium carbonate and a vinyl specific organic peroxide to provide stocks which can be heat cured to yield elastomers which are useful as gasketing materials, shock absorbers and wire insulation. The gums can also be compounded with a silicon-hydrogen containing polymer and a catalyst such as chloroplatinic acid and then cured to provide an elastomer.

EXAMPLE 7

Each of three silanes, methylvinyldi-(N-n-butyl-acetamido)silane (Silane A), methylvinyldi-(N-n-propyl-acetamido) silane (Silane B) and methylvinyldi-(N-isopropyl-amido)silane (Silane C) were mixed at room temperature with a hydroxyl endblocked polydimethylsiloxane having a viscosity of about 4,000 centipoise at 25° C. Three mixtures were prepared using 10 grams of polydimethylsiloxane with about 0.35 gram of silane. In one mixture using Silane A, a polydimethylsiloxane gum was obtained overnight at room temperature. In another mixture using Silane B, a viscous polydimethylsiloxane fluid was obtained overnight at room temperature. In a third mixture using Silane C, a polydimethylsiloxane gum was obtained overnight at room temperature.

EXAMPLE 8

A hydroxyl endblocked polydimethylsiloxane having a viscosity of about 4,000 centipoise at 25° C. in an amount of 10 grams was mixed at room temperature with an amount of methylvinyldi-(N-methylacetamido)silane as shown in Table II. The change in viscosity was observed at different time intervals as indicated in Table II.

Table II

| Silane, grams | After 12 hours | 3 days |
|---|---|---|
| 0.1 | tacky gum | tacky gum |
| 0.2 | dry gum | dry gum |
| 0.3 | Dry gum surface, fluid under surface | ″ |
| 0.4 | ″ | ″ |
| 0.5 | ″ | ″ |

That which is claimed is:

1. A method of increasing the molecular weight of a hydroxyl endblocked polydiorganosiloxane consisting essentially of mixing the hydroxyl endblocked polydiorganosiloxane where the organic groups are monovalent radicals selected from the group consisting of methyl, phenyl, and 3,3,3-trifluoropropyl, the organic groups being at least 50 percent methyl radicals, and a silane of the formula

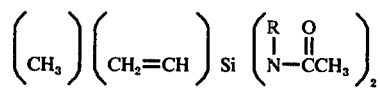

in which R is a monovalent radical selected from the group consisting of an alkyl radical of one to four carbon atoms per radical and phenyl radical, the silane being present in an amount sufficient to provide about one mole of silane per mole of silicon-bonded hydroxyl, and thereafter recovering a polydiorganosiloxane gum having a molecular weight higher than the polydiorganosiloxane mixed with the silane and having methylvinylsiloxane units distributed along the chain of the polydiorganosiloxane of increased molecular weight, said methylvinylsiloxane units coupling the polydiorganosiloxane molecules initially mixed with the silane.

2. The method in accordance with claim 1 in which the silane is present in an amount of from 1 to 3 moles of silane per mole of hydroxyl radical 3. The method in accordance with claim 1 in which the organic groups are methyl radicals.

4. The method in accordance with claim 2 in which the organic groups are methyl radicals.

5. A polydiorganosiloxane obtained by the method of claim 1.

6. A polydiorganosiloxane obtained by the method of claim 3.

7. A polydiorganosiloxane obtained by the method of claim 4.

* * * * *

UNITED STATES PATENT AND TRADEMARK OFFICE
CERTIFICATE OF CORRECTION

PATENT NO. : 4,020,044
DATED : April 26, 1977
INVENTOR(S) : Irvin D. Crossan and Louis H. Toporcer It is certified that error appears in the above-identified patent and that said Letters Patent are hereby corrected as shown below:

Column 1, line 46 - the phrase "R''' is ethyl, propyl or phenyl" should read "R''' is methyl, ethyl, propyl or phenyl"

Column 2, line 40 - the word "methylvinylisiloxane" should read "methylvinylsiloxane"

In Column 2, line 46 - the word "3,3,3-trifluropropyl" should read "3,3,3-trifluoropropyl"

In Column 2, line 66 - the phrase "weights are such the" should read "weights are such that the"

In Column 3, line 34 - the phrase "amount of vinyl one" should read "amount of vinyl radical one"

In Column 4, line 11 and line 12 - the word "polydimethylisiloxane" should read "polydimethylsiloxane"

In Column 5, line 20 - the phrase "with such fillers" should read "with fillers such"

UNITED STATES PATENT AND TRADEMARK OFFICE
CERTIFICATE OF CORRECTION

PATENT NO. : 4,020,044
DATED : April 26, 1977
INVENTOR(S) : Irvin D. Crossan and Louis H. Toporcer It is certified that error appears in the above-identified patent and that said Letters Patent are hereby corrected as shown below:

In Column 6, line 41 - the phrase "hydroxyl radical" should read "hydroxyl radical."

Signed and Sealed this

Fifth Day of January 1982

[SEAL]

Attest:

Attesting Officer

GERALD J. MOSSINGHOFF
Commissioner of Patents and Trademarks